US012643503B2

(12) United States Patent　　　(10) Patent No.:　　US 12,643,503 B2

Maciel Castellanos et al.　　　(45) Date of Patent:　　Jun. 2, 2026

(54) VEHICLE SENSOR CLEANING SYSTEM WITH LAMINAR FLOW

(71) Applicant: FORD GLOBAL TECHNOLOGIES, LLC, Dearborn, MI (US)

(72) Inventors: Carlos Francisco Maciel Castellanos, Pittsburgh, PA (US); Pablo Arturo Zuniga Perez, Pittsburgh, PA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 269 days.

(21) Appl. No.: 17/943,484

(22) Filed: Sep. 13, 2022

(65) Prior Publication Data

US 2024/0083389 A1　　　Mar. 14, 2024

(51) Int. Cl.
| | |
|---|---|
| B60S 1/48 | (2006.01) |
| B60S 1/50 | (2006.01) |
| B60S 1/52 | (2006.01) |
| B60S 1/56 | (2006.01) |
| G01S 7/497 | (2006.01) |
| G01S 17/931 | (2020.01) |

(52) U.S. Cl.
CPC ................. B60S 1/481 (2013.01); B60S 1/50 (2013.01); B60S 1/52 (2013.01); B60S 1/56 (2013.01); G01S 7/497 (2013.01); G01S 17/931 (2020.01); G01S 2007/4977 (2013.01)

(58) Field of Classification Search
None
See application file for complete search history.

(56) References Cited

U.S. PATENT DOCUMENTS

| | | | | |
|---|---|---|---|---|
| 6,764,212 | B1 * | 7/2004 | Nitta | F16K 7/123 |
| | | | | 366/160.2 |
| 9,425,654 | B2 | 8/2016 | Lenius et al. | |
| 9,882,433 | B2 | 1/2018 | Lenius et al. | |
| 10,042,042 | B2 | 8/2018 | Miremadi | |
| 10,109,183 | B1 | 10/2018 | Franz et al. | |
| 10,122,416 | B2 | 11/2018 | Berger et al. | |
| 10,328,906 | B2 | 6/2019 | Hester et al. | |
| 10,987,681 | B2 | 4/2021 | Zhao et al. | |
| 11,097,694 | B2 | 8/2021 | Rachow | |
| 11,281,219 | B2 | 3/2022 | Herse et al. | |

(Continued)

FOREIGN PATENT DOCUMENTS

| | | |
|---|---|---|
| WO | 2018125709 A1 | 7/2018 |
| WO | 2019113368 A1 | 6/2019 |
| WO | 2019152540 A1 | 8/2019 |

*Primary Examiner* — Kaj K Olsen
*Assistant Examiner* — Pradhuman Parihar
(74) *Attorney, Agent, or Firm* — Frank A. Mackenzie; Brooks Kushman P.C.

(57) ABSTRACT

Disclosed herein are system, method, and computer program product embodiments for cleaning one or more sensors of a self-driving system (SDS). For example, the SDS is provided with a sensor with a lens that is formed with a convex outer surface. A nozzle is formed with an opening to provide a liquid in a stream at a fan angle relative to a spray axis. The nozzle is spaced apart from the sensor at a distance based on a radius of the lens and the fan angle and configured to spray the liquid with laminar flow onto a proximal end of the lens such that the liquid flows across the lens from the proximal end to a distal end of the lens to remove debris.

20 Claims, 10 Drawing Sheets

(56)  References Cited

U.S. PATENT DOCUMENTS

| | | | |
|---|---|---|---|
| 2005/0178852 A1* | 8/2005 | Yon | B60S 1/52 |
| | | | 239/284.1 |
| 2007/0084481 A1* | 4/2007 | Franklin | B08B 3/12 |
| | | | 134/1 |
| 2018/0118041 A1 | 5/2018 | Lenius et al. | |
| 2018/0364334 A1 | 12/2018 | Xiang et al. | |
| 2019/0011285 A1 | 1/2019 | Utermoehlen et al. | |
| 2019/0011290 A1 | 1/2019 | Utermoehlen et al. | |
| 2019/0011537 A1 | 1/2019 | Utermoehlen et al. | |
| 2019/0064325 A1 | 2/2019 | Miremadi | |
| 2019/0118737 A1 | 4/2019 | Li et al. | |
| 2019/0146066 A1 | 5/2019 | Kunze | |
| 2019/0179028 A1 | 6/2019 | Pacala et al. | |
| 2019/0204845 A1 | 7/2019 | Grossman et al. | |
| 2020/0159010 A1 | 5/2020 | Kuwae et al. | |
| 2021/0146406 A1* | 5/2021 | Sykula | G01S 7/4813 |
| 2022/0038611 A1 | 2/2022 | Meister et al. | |
| 2022/0057509 A1* | 2/2022 | Sykula | G01S 17/10 |

* cited by examiner

VEHICLE SENSOR CLEANING SYSTEM WITH LAMINAR FLOW

TECHNICAL FIELD

One or more embodiments relate to a system for cleaning vehicle sensors.

BACKGROUND

A vehicle may include a sensor system to monitor its external environment for obstacle detection and avoidance. The sensor system may include multiple sensor assemblies for monitoring objects proximate to the vehicle in the near-field and distant objects in the far-field. Each sensor assembly may include one or more sensors, such as a camera, a radio detection and ranging (radar) sensor, a light detection and ranging (lidar) sensor, and a microphone. A lidar sensor includes one or more emitters for transmitting light pulses away from the vehicle, and one or more detectors for receiving and analyzing reflected light pulses. The sensor system may determine the location of objects in the external environment based on data from the sensors. The vehicle may control one or more vehicle systems, such as a powertrain, braking systems, and steering systems based on the locations of the objects.

The sensors of the sensor system may accumulate debris, such as dirt and salt, which may reduce their functionality with respect to transmitting and/or receiving signals. Accordingly, the proposed systems and methods of the present disclosure provide solutions to clean the sensors that improve the efficiency of the cleaning system without obstructing the sensor's field-of-view.

SUMMARY

In one embodiment, a self-driving system (SDS) is provided with a sensor with a lens formed with a convex outer surface. A nozzle is formed with an opening to provide a liquid in a stream at a fan angle relative to a spray axis. The nozzle is spaced apart from the sensor at a distance based on a radius of the lens and the fan angle and configured to spray the liquid with laminar flow onto a proximal end of the lens such that the liquid flows across the lens from the proximal end to a distal end of the lens to remove debris.

In another embodiment, a method is provided for cleaning a sensor. A liquid is sprayed, from a nozzle, in a stream about a spray axis onto a proximal end of a lens of a sensor of a self-driving system (SDS) at a predetermined flow rate for a predetermined period of time to provide laminar flow, such that the liquid flows across the lens from the proximal end to a distal end to remove debris. The nozzle is mounted at a spray angle relative to the lens, wherein the spray angle is between the spray axis and a plane that extends tangentially from the lens.

In yet another embodiment, a vehicle system is provided with a sensor with a lens formed with a convex outer surface and a nozzle. The nozzle is formed with an opening to provide a liquid in a stream at a fan angle relative to a spray axis. The nozzle being arranged at a spray angle between the spray axis and a plane that extends tangentially from the lens to direct the spray axis toward a proximal end of the lens. The nozzle is configured to spray the liquid at the fan angle and the spray angle at a predetermined flow rate for a predetermined period of time to provide laminar flow such that the liquid flows from the proximal end to a distal end of the lens to remove debris.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 4:
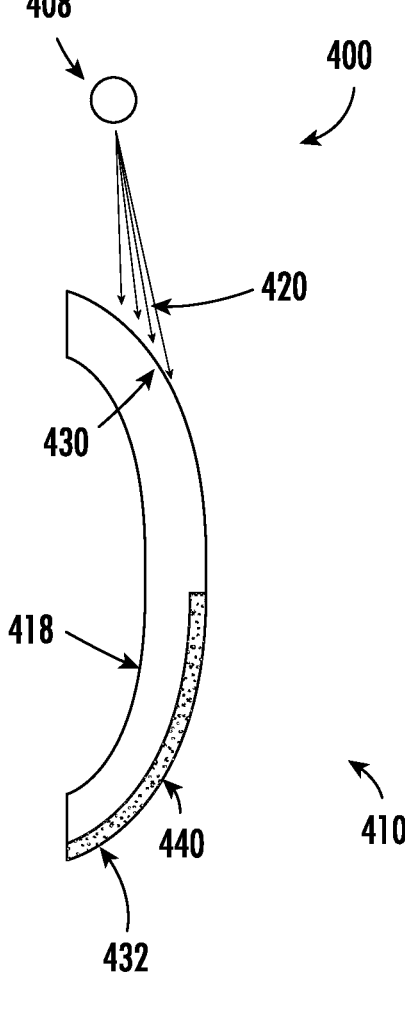
FIG. 4 is a schematic diagram illustrating a nozzle of another cleaning system spraying a liquid with turbulent flow onto a sensor of an SDS.

The sensors of a self-driving system (SDS) may accumulate dirt, salt, debris, and/or other obstructive contaminants, which may reduce their functionality with respect to transmitting and/or receiving signals. The SDS may include a cleaning system with one or more nozzles that are mounted adjacent to the sensor to spray a liquid onto an external lens of the sensor to remove the debris. The nozzle may be mounted laterally adjacent to the external lens so not to block the sensor's field-of-view (FOV). The sensor may include a curved external lens to expand the FOV. However, sensors with curved lenses present a challenge for sensor cleaning due to mounting the nozzles outside the FOV and spraying liquid with turbulent flow on a proximate side of the external lens, which splashes away from the sensor and does not contact or clean a distal side of the lens due to geometry constraints, as shown in FIG. 4. One approach is to mount an additional nozzle near the distal side of the sensor. However, using two nozzles to clean each sensor increases the packaging size and complexity of the cleaning system, and may result in inefficient liquid usage.

According to some aspects of the disclosure, the sensor cleaning system provides solutions to remove the debris from the entire surface of the sensor, while minimizing the number of nozzles and the amount of liquid to clean the sensors. The sensor cleaning system sprays a thin water blade with a highly laminar flow, which is directed at a predetermined angle to form a boundary layer that provides coverage over the entire lens geometry with improved shear force. This approach utilizes a single nozzle for cleaning a camera lens. In doing so, the present solution provides improved liquid coverage and improved shear force over the entire lens surface as compared to cleaning systems that spray a liquid with turbulent flow onto a sensor, such as the cleaning system 400 illustrated in FIG. 4. The sensor cleaning system further maximizes the efficiency of fluid usage by mounting the nozzle at a predetermined distance from the sensor such that liquid spray contacts a tangential surface of the sensor.

Figure 1:
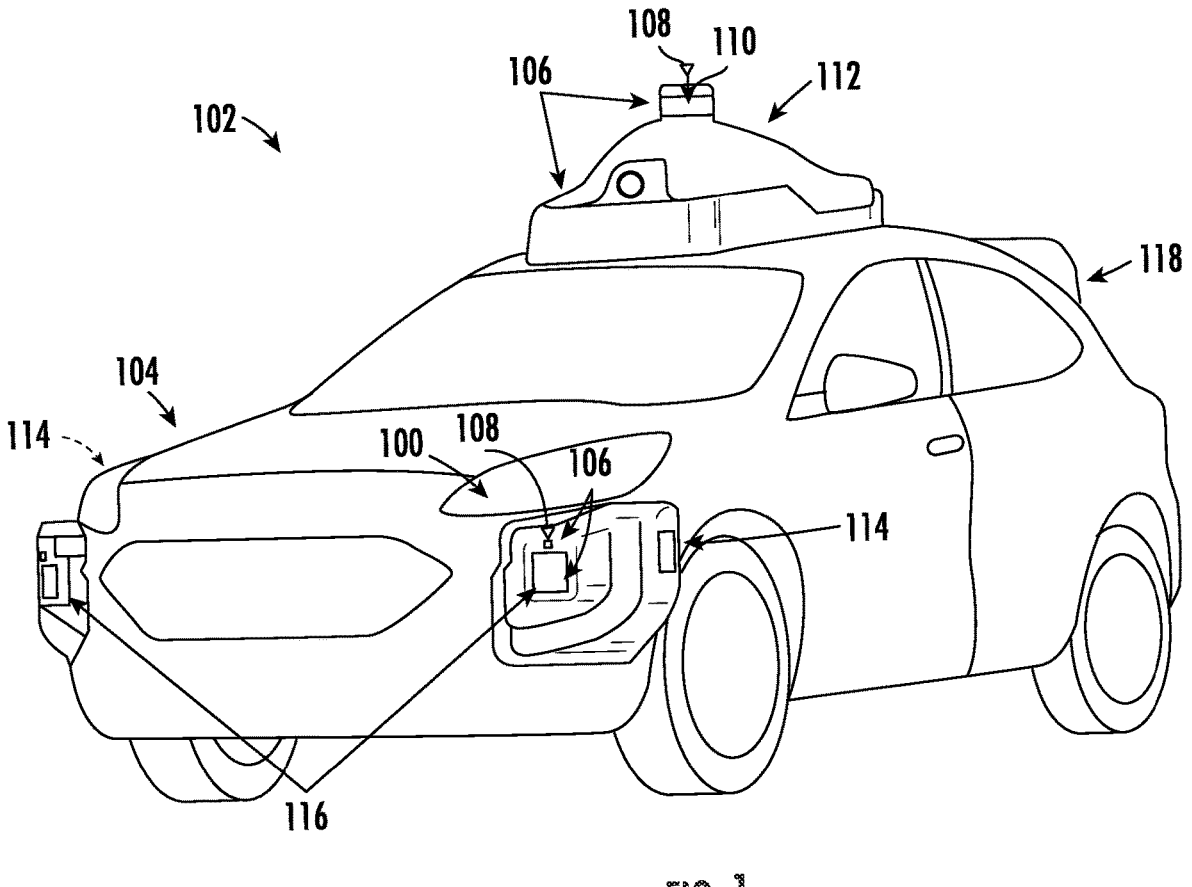
FIG. 1 is a front-perspective view of an exemplary vehicle with a cleaning system for cleaning sensors of a self-driving system (SDS), in accordance with aspects of the disclosure.

With reference to FIG. 1, a cleaning system for cleaning one or more sensors of a self-driving vehicle is illustrated in accordance with aspects of the disclosure and is generally referenced by numeral 100. The cleaning system 100 is integrated with a vehicle system, such as a self-driving system (SDS) 102 of a vehicle 104, such as a self-driving vehicle. The SDS 102 includes a plurality of sensors 106 to monitor an external environment of the vehicle 104. The cleaning system 100 includes a plurality of nozzles 108 to spray liquid 110 onto the sensors 106. Each nozzle 108 is arranged proximate to a sensor 106 and controlled to spray the liquid 110 with laminar flow to clean an entire surface of the sensor 106.

The SDS 102 includes multiple sensor assemblies, that each include one or more sensors 106, to monitor a 360 degree FOV around the vehicle 104, both in the near-field and the far-field. The SDS 102 includes a top sensor assembly 112, two side sensor assemblies 114, two front sensor assemblies 116, and a rear sensor assembly 118, according to aspects of the disclosure. Each sensor assembly includes one or more sensors 106, such as a camera, a lidar sensor, and a radar sensor.

The top sensor assembly 112 may be mounted to a roof of the vehicle 104 and includes multiple sensors 106, such as a lidar sensor and/or multiple cameras. The lidar sensor rotates about a vertical axis to scan a 360 degree FOV about the vehicle 104. The side sensor assemblies 114 may be mounted to a side of the vehicle 104, such as to a front fender as shown in FIG. 1, or within a side view mirror. Each side sensor assembly 114 includes multiple sensors 106, such as a lidar sensor and a camera, to monitor a FOV adjacent to the vehicle 104 in the near-field. The front sensor assemblies 116 are mounted to a front of the vehicle 104, for example, below the headlights. Each front sensor assembly 116 includes multiple sensors 106, such as a lidar sensor, a radar sensor, and a camera, to monitor a FOV in front of the vehicle 104 in the far-field. The rear sensor assembly 118 is mounted to an upper rear portion of the vehicle 104, such as adjacent to a Center High Mount Stop Lamp (CHMSL). The rear sensor assembly 118 includes multiple sensors 106, such as a camera and a lidar sensor, for monitoring the FOV behind the vehicle 104.

Figure 2:
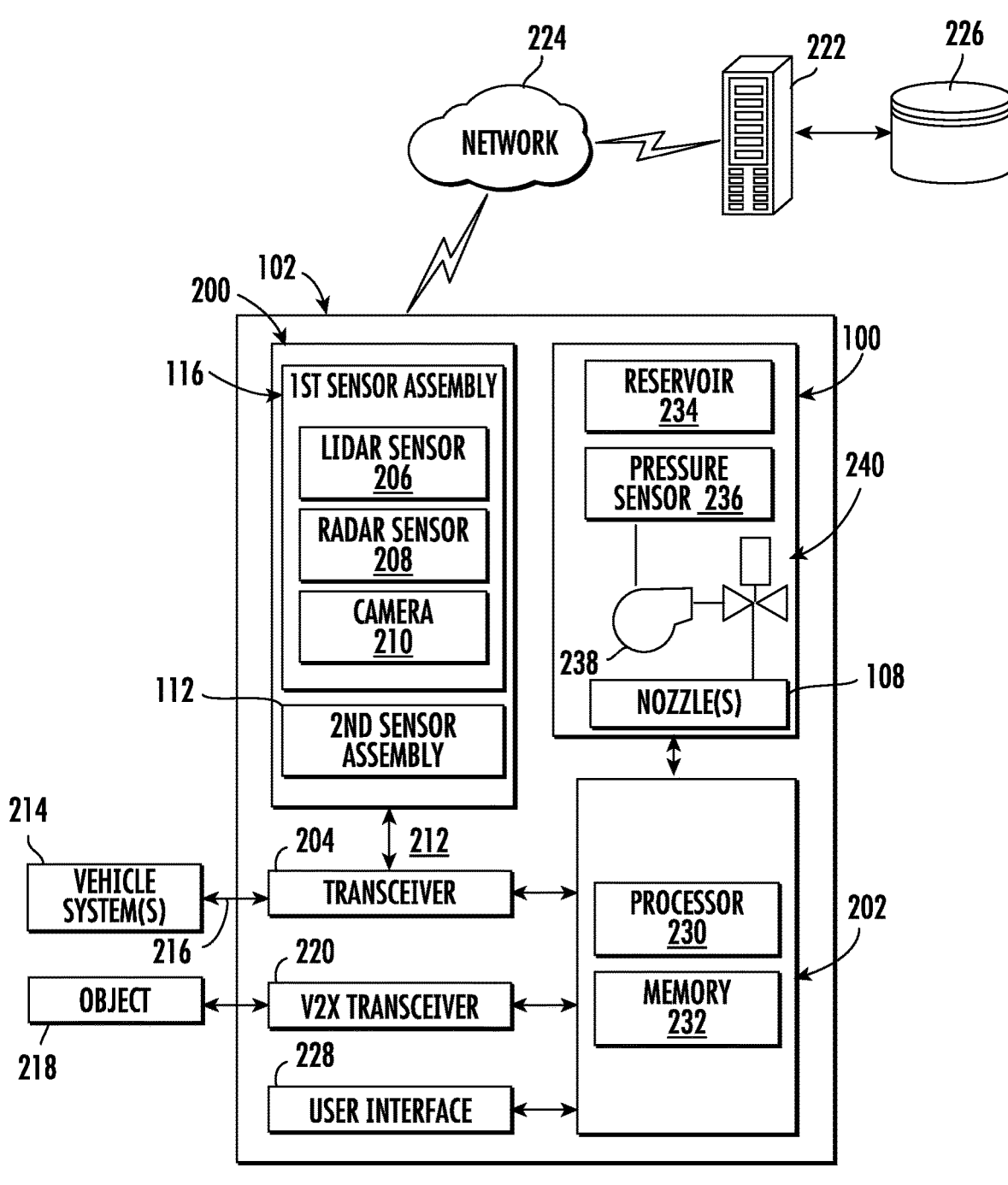
FIG. 2 is a schematic diagram illustrating communication between the SDS and other systems and devices, in accordance with aspects of the disclosure.

FIG. 2 illustrates communication between the SDS 102 and other systems and devices according to aspects of the disclosure. The SDS 102 includes a sensor system 200 and a controller 202. The controller 202 may communicate with other systems and devices directly, or through a transceiver 204. The controller 202 communicates with the cleaning system 100 to control the nozzles 108 to spray the liquid 110 onto the sensors 106.

The sensor system 200 includes the front sensor assembly 116 and the top sensor assembly 112. The front sensor assembly 116 includes one or more sensors, such as a lidar sensor 206, a radar sensor 208, and a camera 210. The camera 210 may be a visible spectrum camera, an infrared camera, etc., according to aspects of the disclosure. The sensor system 200 may include additional sensors, such as a microphone, a sound navigation and ranging (SONAR) sensor, temperature sensors, position sensors (such as global positioning system (GPS) sensors, etc.), location sensors, fuel sensors, motion sensors (such as inertial measurement units (IMU), etc.), humidity sensors, occupancy sensors, or the like. The sensor system 200 provides sensor data 212 that is indicative of the external environment of the vehicle 104. The controller 202 analyzes the sensor data 212 to identify and determine the location of external objects relative to the vehicle 104, such as the location of traffic lights, remote vehicles, pedestrians, etc.

The SDS 102 also communicates with one or more vehicle systems 214, such as an engine, a transmission, a navigation system, a brake system, etc. through the transceiver 204. The controller 202 may receive information from the vehicle systems 214 that is indicative of present operating conditions, such as vehicle speed, engine speed, turn signal status, brake position, vehicle position, steering angle, and ambient temperature. The controller 202 may also control one or more of the vehicle systems 214 based on the sensor data 212, for example, the controller 202 may control a braking system and a steering system to avoid an obstacle. The controller 202 may communicate directly with the vehicle systems 214 or communicate indirectly with the vehicle systems 214 over a vehicle communication bus, such as a CAN bus 216.

The SDS 102 may also communicate with external objects 218, such as remote vehicles and structures, to share the external environment information and/or to collect additional external environment information. The SDS 102 may include a vehicle-to-everything (V2X) transceiver 220 that is connected to the controller 202 for communicating with the objects 218. For example, the SDS 102 may use the V2X transceiver 220 for communicating directly with: a remote vehicle by vehicle-to-vehicle (V2V) communication, a structure (such as a sign, a building, or a traffic light) by vehicle-to-infrastructure (V2I) communication, and a motorcycle by vehicle-to-motorcycle (V2M) communication. Each V2X device may provide information indictive of its own status, or the status of another V2X device.

The SDS 102 may communicate with a remote computing device 222 over a communications network 224 using one or more of the transceivers 204, 220, for example, to provide a signal indicative of a message or visual that indicates the location of the objects 218 relative to the vehicle 104, based on the sensor data 212. The remote computing device 222 may include one or more servers to process one or more processes of the technology described herein. The remote computing device 222 may also communicate data with a database 226 over the network 224.

The SDS 102 also includes a user interface 228 to provide information to a user of the vehicle 104. The controller 202 may control the user interface 228 to provide a message or visual that indicates the location of the objects 218 relative to the vehicle 104, based on the sensor data 212.

Although the controller 202 is described as a single controller, it may contain multiple controllers, or may be embodied as software code within one or more other controllers. The controller 202 includes a processing unit, or processor 230, that may include any number of microprocessors, ASICs, ICs, memory (such as FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. The controller 202 also includes memory 232, or non-transitory computer-readable storage medium, that is capable of executing instructions of a software program. The memory 232 may be, but is not limited to, an electronic storage device, a magnetic storage device, an optical storage device, an electromagnetic storage device, a semi-conductor storage device, or any suitable combination thereof. In general, the processor 230 receives instructions, for example from the memory 232, a computer-readable medium, or the like, and executes the instructions. The controller 202, also includes predetermined data, or "look up tables" that is stored within memory, according to aspects of the disclosure.

The cleaning system 100 includes one or more reservoirs 234 for storing the liquid 110. The cleaning system 100 includes a sensor 236 for monitoring the pressure of the liquid 110 and one or more pumps 238 for increasing the pressure of the liquid 110. The cleaning system 100 also includes one or more actuators 240 that are controlled by the controller 202 to open and close the supply of liquid 110 to the nozzles 108. The controller 202 controls the pump(s) 238 and the actuator(s) 240 to collectively spray the liquid 110 from the nozzle 108 at a predetermined pressure and flow rate for a predetermined period of time to provide laminar flow of the liquid 110 over the sensor 106. The liquid 110 may be a variety of known substances that can clean dirt, debris, etc. from the sensors 106, such as water, organic solvents, inorganic solvents, glycol mixtures, ethanol mixtures, isopropyl alcohol mixtures, ammonia mixtures, or any other washer fluids.

Figure 3:
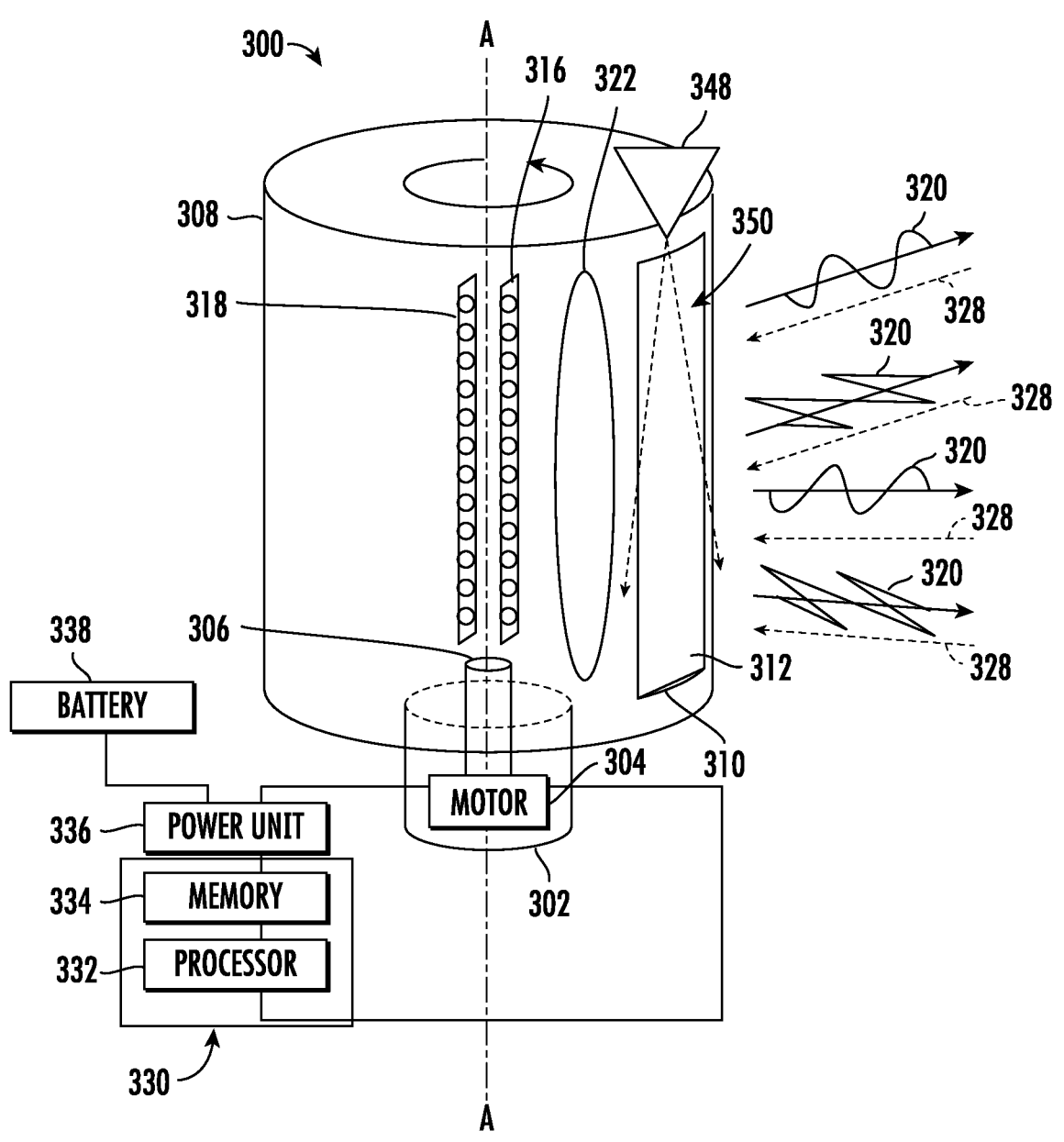
FIG. 3 is an exemplary architecture of a lidar sensor of the SDS, in accordance with aspects of the disclosure.

FIG. 3 illustrates an exemplary architecture of a lidar sensor 300, such as the lidar sensor 206 of the front sensor assembly 116 or the top sensor assembly 112, according to aspects of the disclosure. The lidar sensor 300 includes a base 302 that is mounted to the vehicle 104. The base 302 includes a motor 304 with a shaft 306 that extends along a vertical Axis A-A. The lidar sensor 300 also includes a housing 308 that is secured to the shaft 306 and mounted for rotation relative to the base 302 about Axis A-A. The housing 308 includes an opening 310 and a cover 312 that is secured within the opening 310. The cover 312 is formed of a material that is transparent to light, such as glass. Although a single cover 312 is shown in FIG. 3, the lidar sensor 300 may include multiple covers 312, or a cover 312 that spans the entire outer surface of the housing 308 (shown in FIG. 9).

The lidar sensor 300 includes one or more emitters 316 for transmitting light pulses 320 through the cover 312 and away from the vehicle 104. The light pulses 320 are incident on one or more objects, and reflect back toward the lidar sensor 300 as reflected light pulses 328. The lidar sensor 300 also includes one or more light detectors 318 for receiving the reflected light pulses 328 that pass through the cover 312. The detectors 318 also receive light from external light sources, such as the sun. The lidar sensor 300 rotates about Axis A-A to scan the region within its FOV. The lidar sensor 300 may rotate 360 degrees about the axis, and ignore data reflected off of the vehicle 104. The emitters 316 and the detectors 318 may be stationary and mounted to the base 302, or dynamic and mounted to the housing 308.

The emitters 316 may include laser emitter chips or other light emitting devices and may include any number of individual emitters (such as 8 emitters, 64 emitters, or 128 emitters). The emitters 316 may transmit light pulses 320 of substantially the same intensity or of varying intensities, and in various waveforms, such as sinusoidal, square-wave, and sawtooth. The lidar sensor 300 may include one or more optical elements 322 to focus and direct light that is passed through the cover 312.

The detectors 318 may include a photodetector, or an array of photodetectors, that is positioned to receive the reflected light pulses 328. According to aspects of the disclosure, the detectors 318 include a plurality of pixels, wherein each pixel includes a Geiger-mode avalanche photodiode, for detecting reflections of the light pulses during each of a plurality of detection frames. In other embodiments, the detectors 318 include passive imagers.

The lidar sensor 300 includes a controller 330 with a processor 332 and memory 334 to control various components, such as the motor 304, the emitters 316, and the detectors 318. The controller 330 also analyzes the data collected by the detectors 318, to measure characteristics of the light received, and generates information about the environment external to the vehicle 104. The controller 330 may be integrated with another controller, such as the controller 202 of the SDS 102. The lidar sensor 300 also includes a power unit 336 that receives electrical power from a vehicle battery 338, and supplies the electrical power to the motor 304, the emitters 316, the detectors 318, and the controller 330.

A nozzle 348 is mounted proximate to the lidar sensor 300, in accordance with aspects of the disclosure. The nozzle 348 is controlled to spray liquid 350 with laminar flow across the cover 312 to remove debris. It can be appreciated that the nozzle 348 and/or other nozzles of the disclosed cleaning system may be installed to clean a plurality of other sensors such as cameras and other optical sensors as would be appreciated by those skilled in the art.

FIG. 4 illustrates a cleaning system 400 that sprays liquid with turbulent flow onto a sensor. The cleaning system 400 includes a nozzle 408 that is mounted adjacent to a camera 410 with an outer lens 418 that is curved or formed in a convex shape. The nozzle 408 sprays liquid 420 with turbulent flow at a proximal end 430 of the outer lens 418. The liquid 420 splashes away from the outer lens 418 so that the liquid 420 does not contact or clean debris 440 from a distal end 432 of the outer lens 418.

Figure 5:
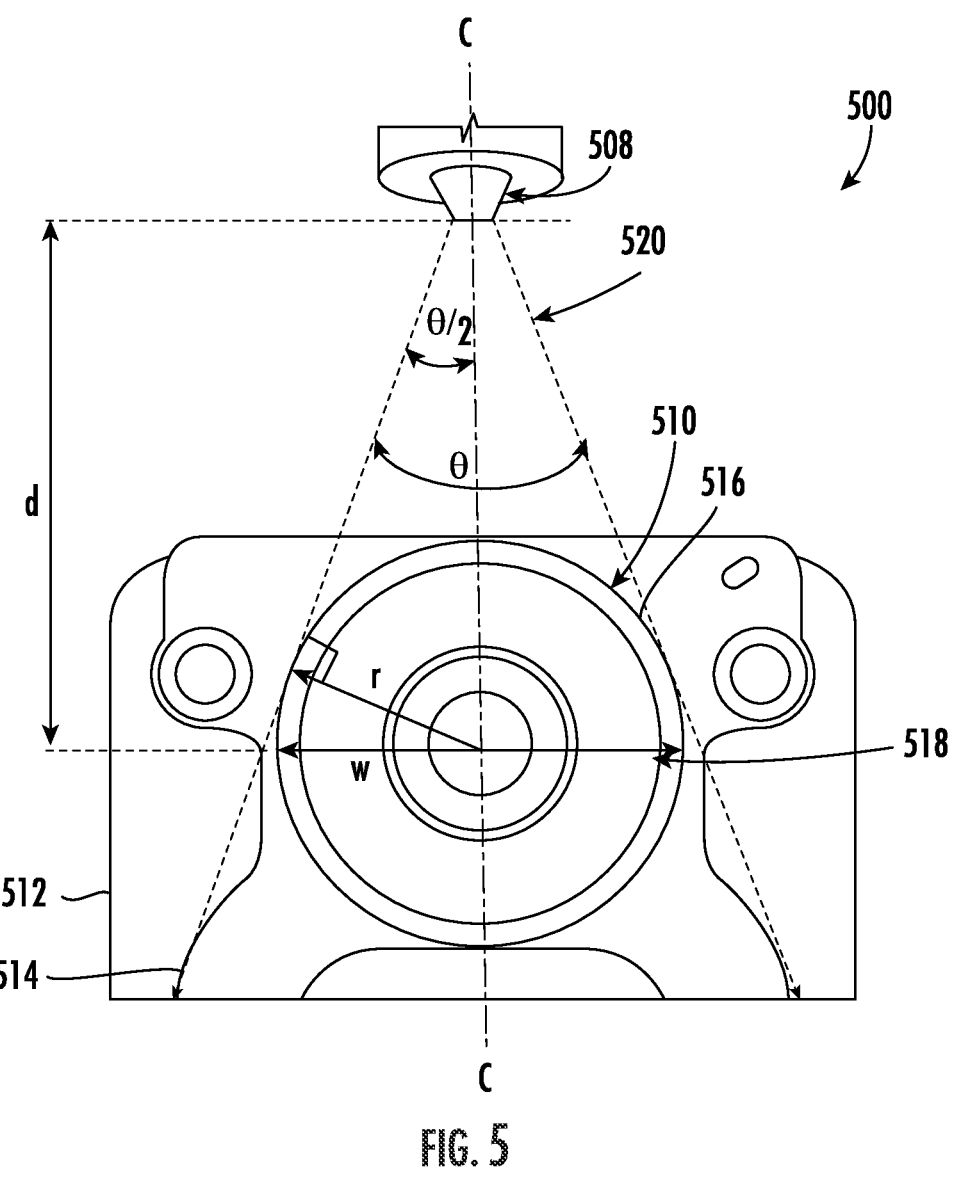
FIG. 5 is an enlarged front view of a nozzle of the cleaning system of FIG. 1, illustrated spraying a liquid with laminar flow onto a camera of the SDS, in accordance with aspects of the disclosure.

With reference to FIG. 5, a cleaning system 500 includes a nozzle 508 that is mounted adjacent to a camera 510. The camera 510 is included in a sensor assembly, such as the front sensor assembly 116 shown in FIG. 1; and monitors an FOV about an optical Axis B-B (shown in FIG. 7). The camera 510 includes a housing 512 and a bracket 514 for mounting to the vehicle 104. The camera 510 also includes a base 516 that is secured to the bracket 514 and mounted to an outer surface of the vehicle 104 (shown in FIG. 1). The camera 510 also includes an outer lens 518 that extends from the base 516. The outer lens 518 is formed with a curved, or convex outer surface, to provide a larger FOV than a flat lens.

Figure 6:
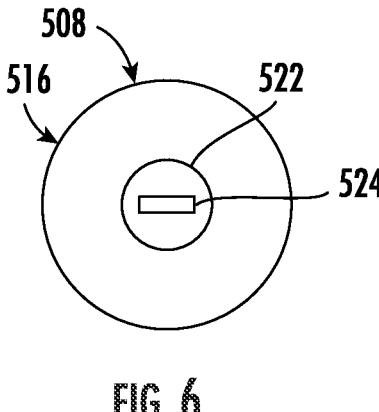
FIG. 6 is a bottom view of the nozzle of FIG. 5, in accordance with aspects of the disclosure.

Referring collectively to FIGS. 5 and 6, the nozzle 508 provides a thin stream of liquid 520 with laminar flow that extends over the entire outer surface of the outer lens 518. The nozzle 508 may be formed in a generally frustoconical shape, or cylindrical shape, with a distal end 522 that includes an opening 524 for the liquid 520 to exit. The opening 524 is formed as a narrow slot to form the liquid 520 in a narrow stream at a fan angle (θ) about a spray Axis C-C. The nozzle 508 is mounted to an external surface of the vehicle 104 (shown in FIG. 1) and spaced apart from a center of the camera 510 at a distance (d) such that the stream of liquid 520 extends across a width (w), or diameter, of the curved outer lens 518 to create laminar flow across the curved outer lens. According to aspects of the disclosure, the fan angle (θ) may be between 25-65 degrees, the distance (d) may be between 8-31 mm, and the width (w) may be between 16-36 mm. In one embodiment, the fan angle (θ) is 30 degrees, the distance (d) is 16 mm, and the width (w) is 16 mm. In another embodiment, the fan angle (θ) is 60 degrees, the distance (d) is 20 mm, and the width (w) is 36 mm. While specific units are provided as examples, it should be appreciated that other units may be suitable according to aspects of the present disclosure.

The location of the nozzle 508 relative to the camera 510 (distance (d)), may be calculated using trigonometry based on the radius (r) of the curved outer lens 518 extending transversely from the edge of the stream of liquid 520 to a center of the outer lens, and one-half of the fan angle (θ) as shown in Equation 1:

$$d = r*\sin^{-1}(\theta/2) \tag{1}$$

The efficiency of the cleaning system 500 is maximized by mounting the nozzle 508 at distance (d). For example, mounting the nozzle 508 at a distance greater than d may result in spraying excess liquid 520 beyond the width of outer lens 518. Mounting the nozzle 508 at a distance less than d may result in not spraying liquid 520 on the outer edges of the outer lens 518, and thereby not cleaning the entire external surface of the outer lens 518.

Figure 7:
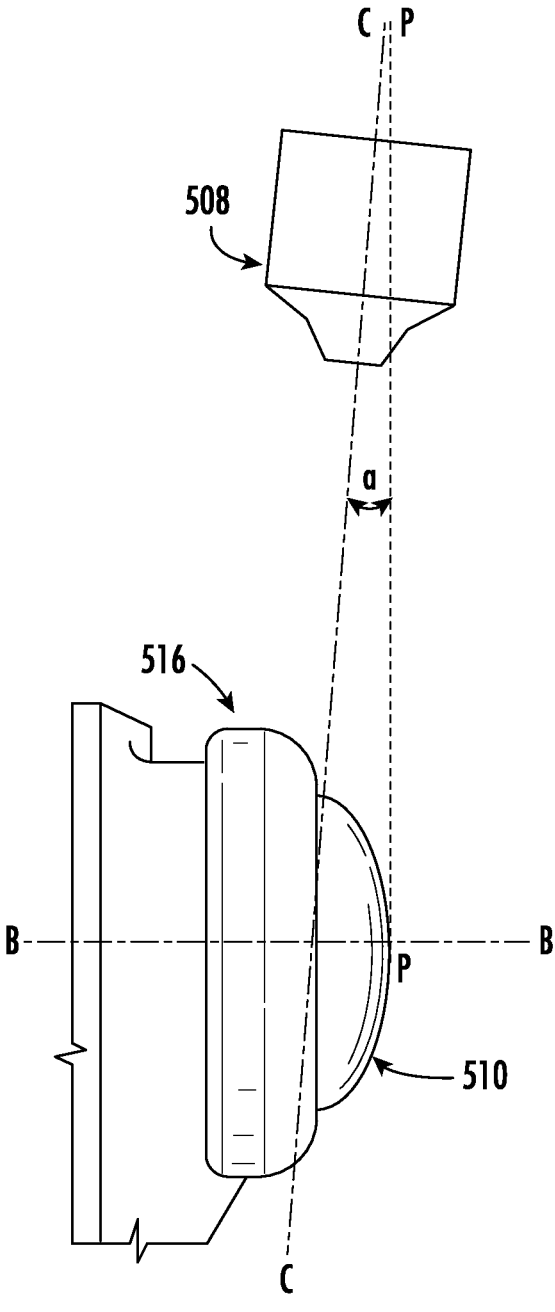
FIG. 7 is a side view of the nozzle and the camera of FIG. 5, in accordance with aspects of the disclosure.

Referring to FIG. 7, the nozzle 508 may be arranged at a spray angle relative to the camera 510. The nozzle 508 is mounted such that the spray Axis C-C is directed toward the base 516 of the camera 510 at a spray angle (α) relative to a plane (P) that extends transversely from the optical Axis B-B and tangentially from the outer lens 518. The spray angle (α) may be positive or negative.

Figure 8:
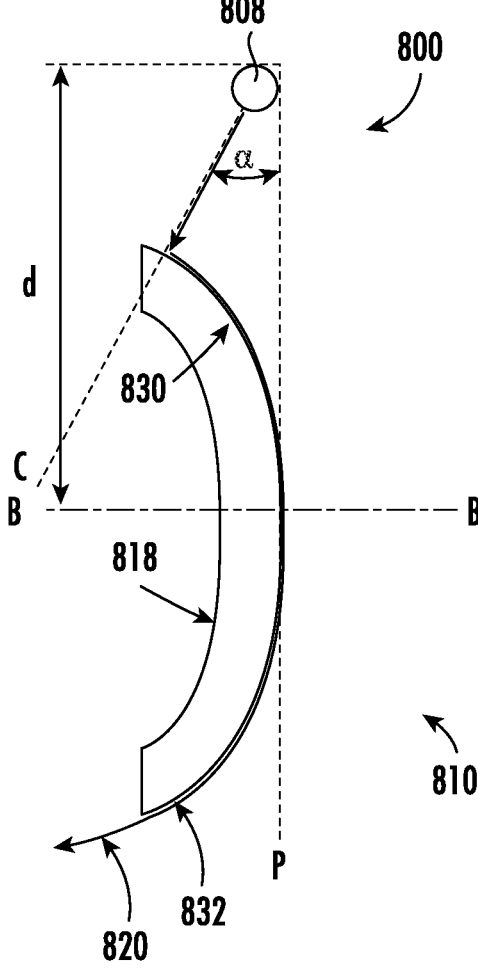
FIG. 8 is a schematic diagram illustrating the nozzle of the cleaning system of FIG. 1 spraying a liquid with laminar flow onto the camera of the SDS, in accordance with aspects of the disclosure.

FIGS. 8 and 4 illustrate how the parameters of the cleaning system impact the flow of the liquid, that is, whether the liquid flow is laminar or turbulent. Laminar flow refers to uninterrupted flow in a fluid near a solid boundary in which the direction of flow at every point remains generally constant. Whereas turbulent flow refers to fluid flow in which the velocity at a given point varies erratically in magnitude and direction.

FIG. 8 illustrates an example cleaning system 800 to provide a liquid 820 with laminar flow over a camera 810. The cleaning system 800 includes a nozzle 808 that is mounted at a distance (d) from the camera 810 and arranged at a spray angle (α) from a plane (P) that extends transversely from the optical Axis B-B and tangentially from the outer lens 818. According to aspects of the disclosure, the nozzle 808 may be mounted at a distance (d) between 16-36 mm, arranged at a spray angle (α) between −5 and +5 degrees; and controlled to spray the liquid 820 at a pressure between 50-90 pounds per square inch (psi) at a flow rate between 300-600 milliliters per minute (mL/min) for 0.5-1.2 seconds to provide laminar flow. In one embodiment, the nozzle 808 is mounted at a distance (d) of 16 mm, arranged at a spray angle (α) of +5 degrees, and controlled to spray the liquid 820 at a pressure of 60 psi at a flow rate of 350 mL/min for 0.5 seconds to provide laminar flow. While specific units are provided as examples, it should be appreciated that other units may be suitable according to aspects of the present disclosure.

As illustrated in FIG. 8, spraying the liquid 820 with laminar flow allows the liquid 820 to contact a proximal end 830 of the outer lens 818 and follow its curved shape to a distal end 832 to remove debris from the entire external surface of the outer lens 818. However, operating the cleaning system 800 outside these parameter ranges may result in turbulent liquid flow, such as that shown in FIG. 4, or detachment of the liquid boundary layer from the outer lens 418 immediately after passing the proximal end 430. Such turbulent liquid flow may remove the debris 440 from the proximal end 430 of the outer lens 418, but it does not fully clean the entire surface of the outer lens 418.

Figure 9:
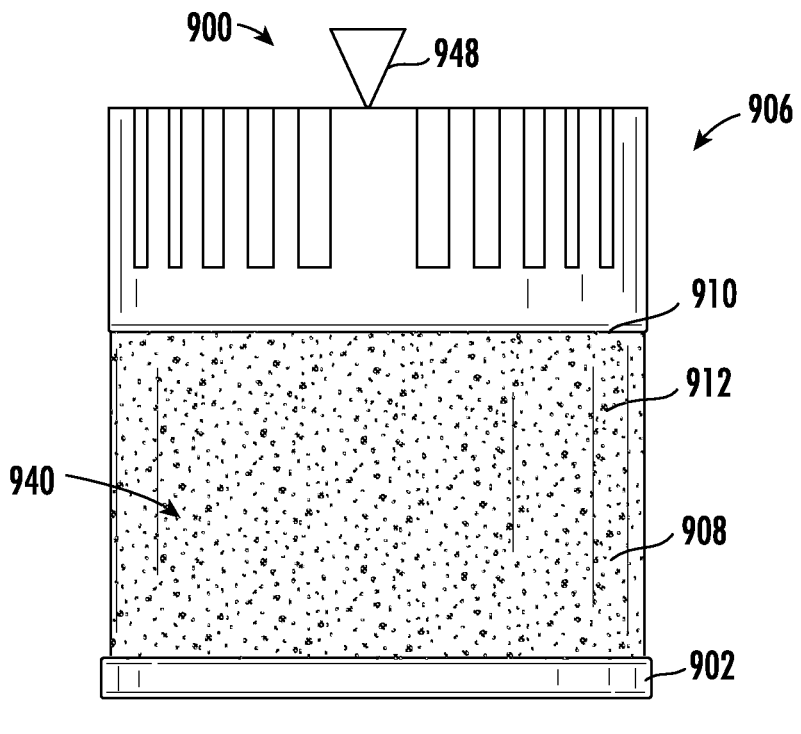
FIG. 9 is a front view of a nozzle of a cleaning system and a lidar sensor of an SDS, in accordance with aspects of the disclosure.

FIG. 9 illustrates a cleaning system 900 that includes a nozzle 948 that is mounted adjacent to another sensor (e.g., an optical sensor like the lidar sensor 906), in accordance with aspects of the disclosure. The lidar sensor 906 is included in a sensor assembly, such as the top sensor assembly 112 shown in FIG. 1, or other sensors located in different portions of the top sensor assembly 112. The lidar sensor 906 includes a base 902 that is mounted to the vehicle 104 (shown in FIG. 1). The lidar sensor 906 also includes a housing 908 that is mounted for rotation relative to the base 902. The housing 908 includes an opening 910 and a lens, such as a cover 912, that is secured within the opening 910. The cover 912 is formed in a generally cylindrical shape and formed of a material that is transparent to light, such as glass and spans the entire outer surface of the housing 908.

The lidar sensor 906 includes one or more emitters 316 (shown in FIG. 3) for transmitting light pulses through the cover 912 and away from the vehicle 104. The light pulses are incident on one or more objects and reflect back toward the lidar sensor 906 as reflected light pulses. The lidar sensor 906 also includes one or more light detectors 318 (shown in FIG. 3) for receiving the reflected light pulses that pass through the cover 912.

Figure 10:
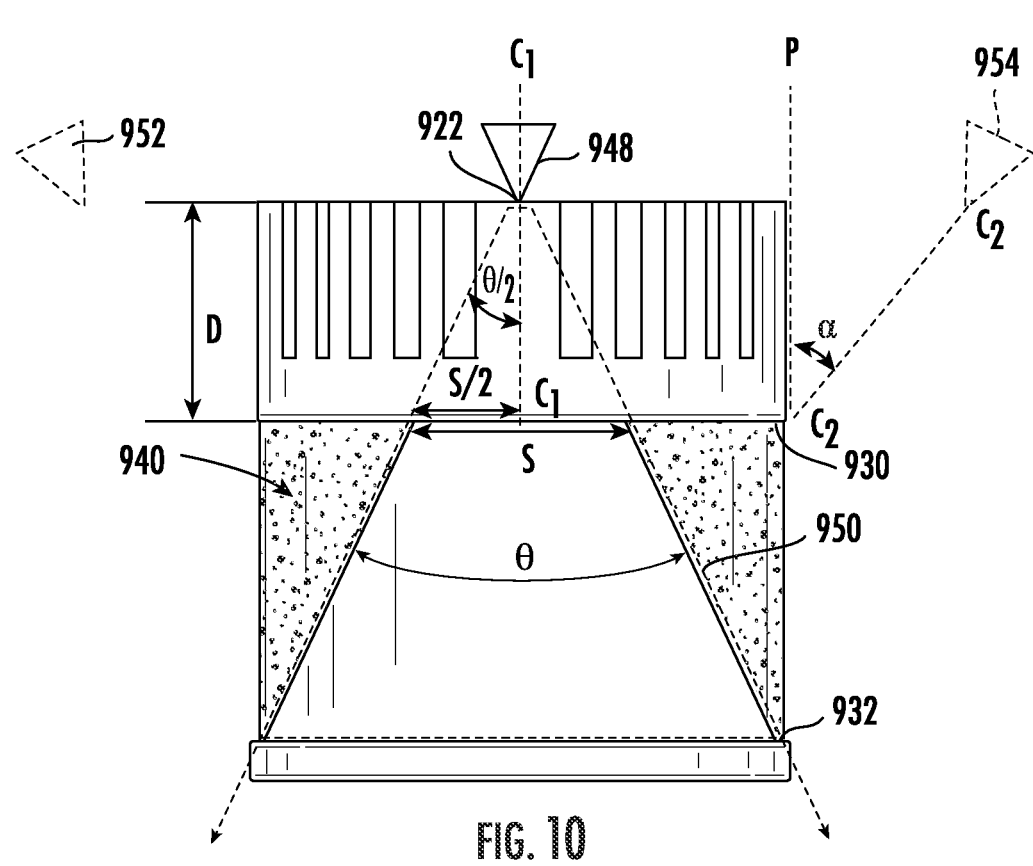
FIG. 10 is another front view of the nozzle of the cleaning system of FIG. 9, illustrated spraying a liquid with laminar flow onto the lidar sensor of the SDS, in accordance with aspects of the disclosure.

Referring collectively to FIGS. 9 and 10, the cover 912 accumulates debris 940 that may obscure the transmission of light to and from the lidar sensor 906, which may result in noise present on the sensor data 212. The nozzle 948 is controlled to spray liquid 950 across the cover 912 to remove the debris 940. As illustrated in FIG. 10, spraying the liquid 950 with laminar flow allows the liquid 950 to contact a proximal end 930 of the cover 912 and follow its curved shape to a distal end 932 to remove debris from the external surface of the cover 912. The cleaning system 100 may include multiple nozzles, such as the nozzle 948, a second nozzle 952, and a third nozzle 954, that are circumferentially spaced apart from each other around the housing 908 to clean the entire external surface of the cover 912 within the (FOV). Alternatively, the nozzle 948 may be mounted to a fixed surface, and the housing 908 may rotate relative to the nozzle 948 such that a single nozzle may be used to clean the entire external surface of the cover 912.

The nozzle 948 may be formed in a generally frustoconical shape, or a cylindrical shape, with a distal end 922 that includes an opening (not shown) for the liquid 950 to exit. The opening may be formed as a narrow slot, like the opening 524 of the nozzle 508 of FIG. 6, to form the liquid 950 in a thin stream at a fan angle (θ) about a spray Axis C₁-C₁. Each nozzle 948, 952, 954 may be arranged at a spray angle ($\alpha$) relative to the lidar sensor 906. As illustrated in FIG. 10, the third nozzle 954 is mounted such that the spray Axis $C_2$-$C_2$ is directed toward the proximal end 930 of the cover 912 at a spray angle ($\alpha$) relative to a plane (P) that extends tangentially from the cover 912.

The location of the nozzle 948 relative to the lidar sensor 906, (distance (D)) may be estimated using trigonometry equations, based on one-half of a segment (S) of the circumference of the cover 912, and one-half of the fan angle ($\theta$). The segment (S) is a portion of the proximal end 930 of the cover 912. The number of nozzles used may be estimated by dividing the length of the circumference of the cover 912 within the FOV by the length of segment (S). According to aspects of the disclosure, the nozzle 948 may be mounted at a distance (D) between 25-50 mm, a fan angle ($\theta$) between 40-65 degrees, a segment (S) between 15-65 mm, and a spray angle ($\alpha$) between 5-20 degrees. In one embodiment, the distance (D) is 30 mm, the fan angle ($\theta$) is 50 degrees, the segment (S) is 28 mm, and the spray angle ($\alpha$) is 15 degrees. Although the segment (S) is curved, and not linear, it still can be used to estimate the number of nozzles required to cover the FOV. The cleaning system 900 may control each nozzle 948, 952, 954 to spray the liquid 950 at a pressure between 50-90 psi, and a flow rate between 300-600 mL/min for 0.5-1.2 seconds to provide laminar flow. While specific units are provided as examples, it should be appreciated that other units may be suitable according to aspects of the present disclosure.

Figure 11:
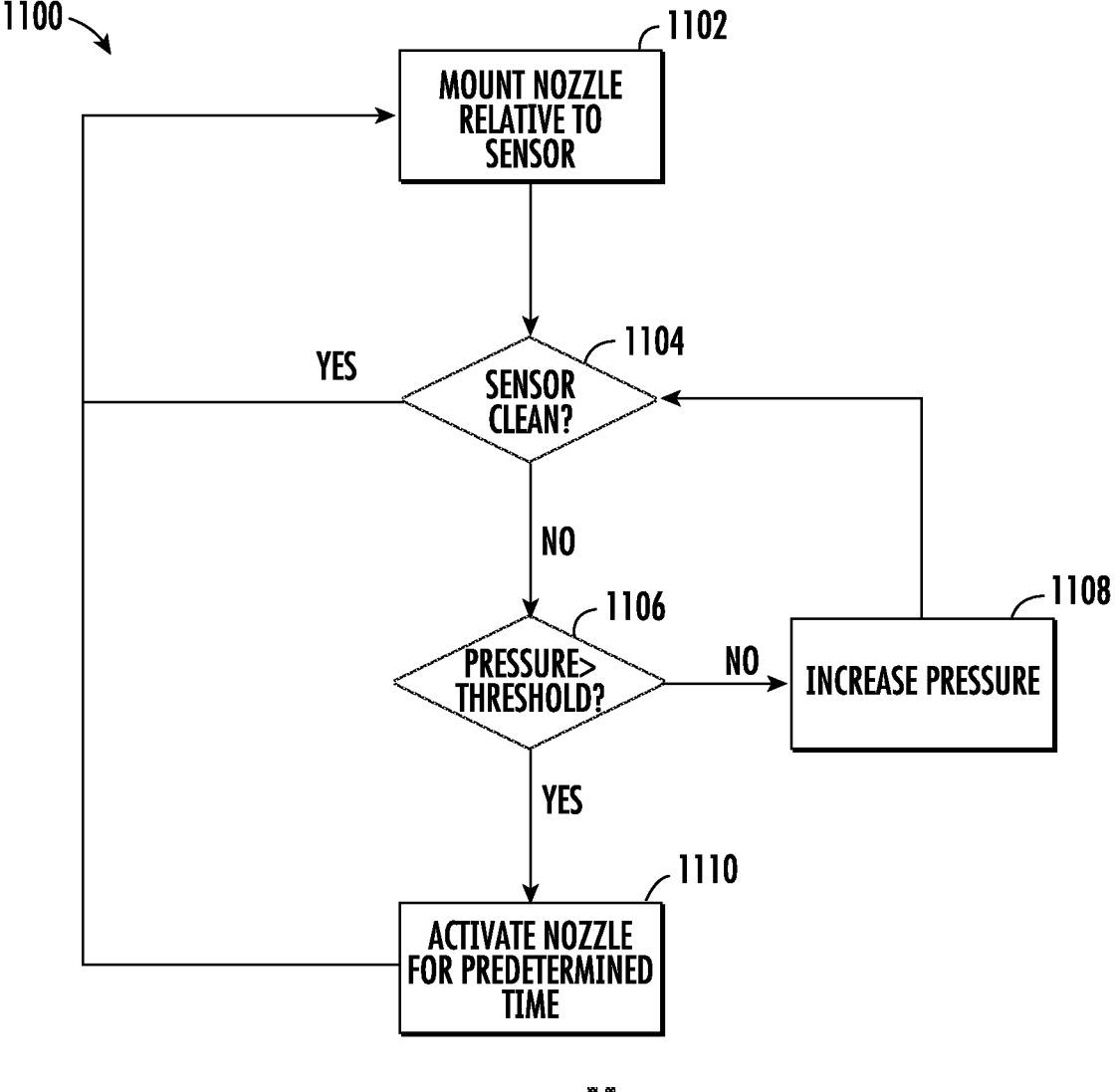
FIG. 11 is a flow chart illustrating a method for cleaning a sensor of a SDS, in accordance with aspects of the disclosure.

With reference to FIG. 11, a flow chart depicting a method for cleaning a sensor, such as a camera or lidar sensor, is illustrated in accordance with one or more embodiments and is generally referenced by numeral 1100. Aspects of the method 1100 are implemented using software code that is executed by the processor 230 and contained within the memory 232 (FIG. 2) according to aspects of the disclosure. While the flowchart is illustrated with a number of sequential steps, one or more steps may be omitted and/or executed in another manner without deviating from the scope and contemplation of the present disclosure.

At step 1102, the nozzle 108 is mounted relative to the sensor 106 at a predetermined distance. For example, the nozzle 508 may be mounted at a distance (d) from the camera 510 that is determined based on trigonometry equations, such as Equation 1.

At step 1104, the controller 202 determines if the sensor 106 is clean, for example, if the outer lens 518 of the camera 510 or the cover 912 of the lidar sensor 906 is clean. The controller 202 may determine if the sensor 106 is clean based on the signal-to-noise ratio of the sensor data 212. If the sensor 106 is clean, the controller 202 may return to step 1102. If the sensor is not clean, the sensor 106 may proceed to step 1106.

At step 1106, the controller 202 evaluates the pressure of the liquid 110 within the cleaning system 100 to determine if the pressure is greater than a threshold pressure, such as 60 psi. If not, the controller 202 may proceed to step 1108 and control the pump 238 to increase the pressure. If the pressure is greater than the threshold pressure, the controller 202 proceeds to step 1110 and controls the actuator 240 to open to supply the liquid 110 to the nozzle 108 for a predetermined period of time, such as 0.5 seconds, to spray the liquid 110 onto the sensor 106 to remove the debris.

Figure 12:
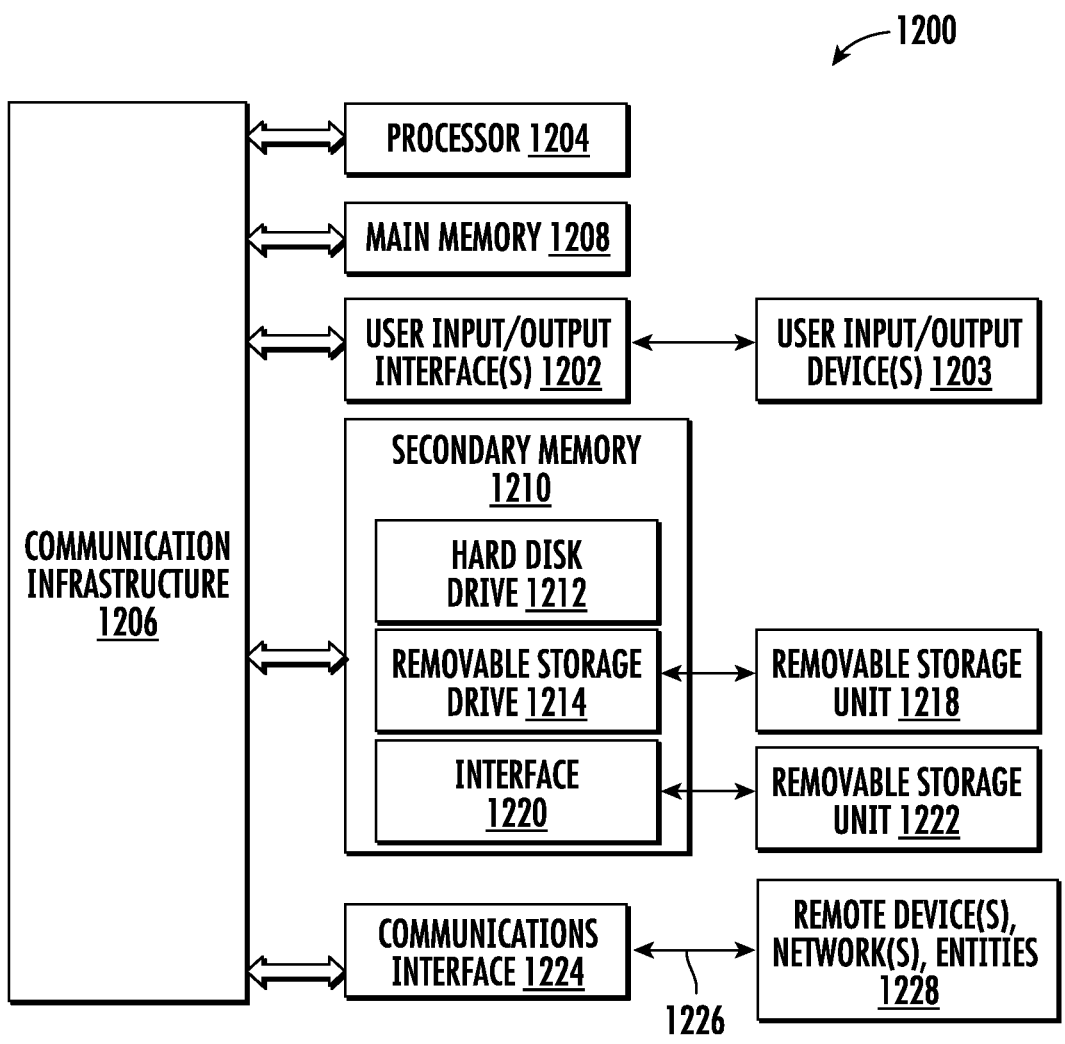
FIG. 12 is a detailed schematic diagram of an example computer system for implementing various embodiments, in accordance with aspects of the disclosure.

The cleaning system 100 may be implemented in the SDS 102, which includes one or more controllers, such as computer system 1200 shown in FIG. 12. The computer system 1200 may be any computer capable of performing the functions described herein. The computer system 1200 also includes user input/output interface(s) 1202 and user input/output device(s) 1203, such as buttons, monitors, keyboards, pointing devices, etc.

The computer system 1200 includes one or more processors (also called central processing units, or CPUs), such as a processor 1204. The processor 1204 is connected to a communication infrastructure or bus 1206. The processor 1204 may be a graphics processing unit (GPU), such as a specialized electronic circuit that is configured to process mathematically intensive applications, with a parallel structure for parallel processing large blocks of data, such as mathematically intensive data common to computer graphics applications, images, videos, etc.

The computer system 1200 also includes a main memory 1208, such as random-access memory (RAM), that includes one or more levels of cache and stored control logic (i.e., computer software) and/or data. The computer system 1200 may also include one or more secondary storage devices or secondary memory 1210, such as a hard disk drive 1212; and/or a removable storage device 1214 that may interact with a removable storage unit 1218. The removable storage device 1214 and the removable storage unit 1218 may be a floppy disk drive, a magnetic tape drive, a compact disk drive, an optical storage device, tape backup device, and/or any other storage device/drive.

The secondary memory 1210 may include other means, instrumentalities or other approaches for allowing computer programs and/or other instructions and/or data to be accessed by computer system 1200, such as an interface 1220 and a removable storage unit 1222, such as a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 1200 may further include a network or communication interface 1224 to communicate and interact with any combination of remote devices, remote networks, remote entities, etc. (individually and collectively referenced by reference number 1228). For example, the communication interface 1224 may allow the computer system 1200 to communicate with remote devices 1228 over a communication path 1226, which may be wired and/or wireless, and which may include any combination of LANs, WANs, the Internet, etc. The control logic and/or data may be transmitted to and from computer system 1200 via communication path 1226.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, the computer system 1200, the main memory 1208, the secondary memory 1210, and the removable storage units 1218 and 1222, as well as tangible articles of manufacture embodying any combination of the foregoing. Such control logic, when executed by one or more data processing devices (such as the computer system 1200), causes such data processing devices to operate as described herein.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. A self-driving vehicle or an "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, the present solution is being described herein in the context of an autonomous vehicle. However, the present solution is not limited to autonomous vehicle applications. The present solution may be used in other applications such as advanced driver assistance systems (ADAS), robotic applications, radar system applications, metric applications, and/or system performance applications.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments, but should be defined only in accordance with the following claims and their equivalents.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A self-driving system (SDS) comprising: a vehicle; a sensor with a lens formed with a convex outer surface; and a nozzle formed with an opening to provide a liquid in a stream at a fan angle relative to a spray axis; wherein the nozzle is spaced apart from the sensor at a distance based on a radius of the lens and the fan angle such that the nozzle is configured to spray the liquid with laminar flow onto a proximal end of the lens such that the liquid flows from the proximal end to a distal end of the lens to remove debris.

2. The SDS of claim 1, wherein the fan angle is between twenty-five and sixty-five degrees.

3. The SDS of claim 1, wherein the nozzle is configured to mount at a spray angle between the spray axis and a plane that extends tangentially from the lens to direct the spray axis toward the proximal end of the lens.

4. The SDS of claim 3, wherein the spray angle is between negative five and positive five degrees.

5. The SDS of claim 1, further comprising:
a reservoir to store the liquid;
an actuator to enable and disable liquid communication from the reservoir to the nozzle; and
a controller programmed to control the actuator to enable the liquid communication to the nozzle at a predetermined flow rate for a predetermined period of time to spray the liquid with laminar flow.

6. The SDS of claim 5, wherein the predetermined flow rate is between 300 and 600 milliliters per minute, and wherein the predetermined period of time is between 0.5 and 1.2 seconds.

7. The SDS of claim 5, further comprising:
a pump to increase a pressure of the liquid within the reservoir; and
wherein the controller is further programmed to control the pump to increase the pressure of the liquid above a threshold pressure.

8. The SDS of claim 7, wherein the threshold pressure at the nozzle is between fifty and ninety pounds per square inch.

9. The SDS of claim 1, wherein the sensor comprises a camera and wherein the lens is formed in a semi-spherical shape,
wherein the fan angle is between twenty-five and sixty-five degrees, and
wherein the nozzle is configured to mount at a spray angle between the spray axis and a plane that extends tangentially from the lens, the spray angle being between negative five and positive five degrees.

10. The SDS of claim 1, wherein the sensor comprises a lidar sensor and wherein the lens is formed in a cylindrical shape, and wherein the nozzle comprises at least three nozzles circumferentially spaced apart from each other around the lens, wherein the fan angle is between forty and sixty-five degrees, and wherein the nozzle is configured to mount at a spray angle between the spray axis and a plane that extends tangentially from the lens, the spray angle being between five and twenty degrees.

11. The SDS of claim 1, wherein the sensor comprises a lidar sensor and wherein the lens is formed in a cylindrical shape.

12. The SDS of claim 11, wherein at least one of the nozzle and the lens rotates relative to the other of the nozzle and the lens to clean the lens with the nozzle.

13. A self-driving system (SDS) comprising: a vehicle; a sensor with a lens formed with a convex outer surface; and a nozzle formed with an opening to provide a liquid in a stream at a fan angle relative to a spray axis; wherein the nozzle is spaced apart from the sensor at a distance based on a radius of the lens and the fan angle such that the nozzle is configured to spray the liquid with laminar flow characterized by a Reynolds number below 2300 onto a proximal end of the lens such that the liquid flows from the proximal end to a distal end of the lens to remove debris.

14. The SDS of claim 13, wherein the fan angle is between twenty-five and sixty-five degrees.

15. The SDS of claim 13, wherein the nozzle is configured to mount at a spray angle between the spray axis and a plane that extends tangentially from the lens to direct the spray axis toward the proximal end of the lens.

16. The SDS of claim 15, wherein the spray angle is between negative five and positive five degrees.

17. The SDS of claim 13, further comprising:

a reservoir to store the liquid;

an actuator to enable and disable liquid communication from the reservoir to the nozzle; and a controller programmed to control the actuator to enable the liquid communication to the nozzle at a predetermined flow rate for a predetermined period of time to spray the liquid with laminar flow.

18. The SDS of claim 17, wherein the predetermined flow rate is between 300 and 600 milliliters per minute, and wherein the predetermined period of time is between 0.5 and 1.2 seconds.

19. The SDS of claim 17, further comprising:

a pump to increase a pressure of the liquid within the reservoir; and wherein the controller is further programmed to control the pump to increase the pressure of the liquid above a threshold pressure.

20. A self-driving system (SDS) comprising: a vehicle; a sensor with a lens formed with a convex outer surface; and a nozzle formed with an opening to provide a liquid in a stream at a fan angle relative to a spray axis; wherein the nozzle is spaced apart from the sensor at a distance based on a radius of the lens and the fan angle calculated by r * sin^1($\theta$/2), where r is the radius of the lens and $\theta$ is the fan angle such that the nozzle is configured to spray the liquid with laminar flow onto a proximal end of the lens such that the liquid flows along the convex outer surface in laminar flow from the proximal end toward a distal end of the lens to remove debris.

\*    \*    \*    \*    \*